United States Patent
Trenda

(10) Patent No.: US 11,077,395 B2
(45) Date of Patent: Aug. 3, 2021

(54) PORTABLE AIR FILTER DEVICE AND METHOD

(71) Applicant: Gary Trenda, Newhall, CA (US)

(72) Inventor: Gary Trenda, Newhall, CA (US)

( * ) Notice: Subject to any disclaimer, the term of this patent is extended or adjusted under 35 U.S.C. 154(b) by 243 days.

(21) Appl. No.: 16/009,438

(22) Filed: Jun. 15, 2018

(65) Prior Publication Data

US 2018/0361291 A1 Dec. 20, 2018

Related U.S. Application Data

(60) Provisional application No. 62/519,978, filed on Jun. 15, 2017.

(51) Int. Cl.
*B01D 46/00* (2006.01)
*B01D 46/10* (2006.01)

(52) U.S. Cl.
CPC ....... *B01D 46/0002* (2013.01); *B01D 46/002* (2013.01); *B01D 46/10* (2013.01); *B01D 2265/04* (2013.01); *B01D 2267/30* (2013.01); *B01D 2275/202* (2013.01); *B01D 2275/205* (2013.01); *B01D 2279/35* (2013.01)

(58) Field of Classification Search
CPC ........... B01D 2265/04; B01D 46/0005; B01D 46/0002; B01D 46/10; B01D 2267/30; B01D 2275/202; B01D 2275/205; B01D 2279/35
See application file for complete search history.

(56) References Cited

U.S. PATENT DOCUMENTS

| | | | | |
|---|---|---|---|---|
| 3,912,473 A | * | 10/1975 | Wilkins | B01D 46/10 55/501 |
| 4,889,542 A | * | 12/1989 | Hayes | B01D 46/00 95/285 |
| 5,525,145 A | * | 6/1996 | Hodge | B01D 46/001 96/17 |
| 6,221,120 B1 | * | 4/2001 | Bennington | B01D 46/10 55/385.1 |
| 6,793,715 B1 | * | 9/2004 | Sandberg | B01D 46/10 55/486 |
| 7,300,499 B1 | | 11/2007 | Fleisher | |
| 7,543,585 B2 | | 6/2009 | Torgerson | |
| 7,892,306 B2 | | 2/2011 | Kummer et al. | |
| 8,323,387 B2 | | 12/2012 | White | |

(Continued)

*Primary Examiner* — Robert Clemente
(74) *Attorney, Agent, or Firm* — Boudwin Intellectual Property; Daniel Boudwin

(57) ABSTRACT

A portable air filter and method of use are provided. The portable air filter includes a semi-permeable air filter, optionally disposed within a frame. An attachment surface, such as an adhesive, is disposed on the frame, for attaching the portable air filter to an air vent. In certain embodiments, a second air filter and frame are slidably connected to the frame. If the portable air filter is not disposed within a frame, the portable air filter is cut to fit over an air vent, and an adhesive, such as tape, is provided for a user to attach the cut filter to fit over the air vent. The method includes attaching the portable air filter to an air vent by pressing the adhesive to a wall, ceiling, or floor such that the portable air filter covers the air vent. The invention is useful for improving air quality in a variety of spaces, including in an airplane, in a hotel, on a cruise ship, on a travel bus, and other public spaces.

19 Claims, 5 Drawing Sheets

(56) References Cited

U.S. PATENT DOCUMENTS

2010/0227545 A1\* 9/2010 Frois .................. B01D 46/10
 454/358
2013/0212990 A1\* 8/2013 Albert ................. B01D 46/10
 55/373

\* cited by examiner

PORTABLE AIR FILTER DEVICE AND METHOD

CROSS REFERENCE TO RELATED APPLICATIONS

This application claims priority under 35 U.S.C. § 119(e) to U.S. Provisional Application No. 62/519,978 filed on Jun. 15, 2017. The above identified patent application is incorporated by reference herein in its entirety to provide continuity of disclosure.

BACKGROUND OF THE INVENTION

Many interior spaces used by the public, such as in an airplane, in a hotel, on a cruise ship, and on a travel bus, have poor air quality that can lead to discomfort, sickness, or illness. Air quality in these spaces can be improved by regular maintenance and cleaning of ventilation systems, but often the regularity or quality of the maintenance and cleaning is insufficient to improve air quality. Because individuals using the interior space with poor air quality often have limited influence on the maintenance and cleaning of ventilation systems, they may desire to ensure a certain degree of air quality in a way that they can control.

While traveling, people may suddenly come down with a headache, fever, cold, and other illnesses. These illnesses could be caused by poor air filtration through vents in an airplane, hotel, etc. The vents may not be cleaned on a consistent basis, leading to unsanitary air particles being distributed through the vent. Pollen, dust, lint, mold spores, and other bacteria can make a trip extremely uncomfortable and unenjoyable.

The number of people that are travelling throughout the word has been growing every year, and travelers are finding themselves more often getting ill when traveling. One billion people travel by air every year and cruise ships claim that their numbers are over a quarter million. It is becoming apparent that the degree of illnesses that face passengers is on the increase. Cruise ships, airplanes, motel rooms, and trains present a unique combination of health concerns. Travelers from diverse areas of the world are often placed in semi-enclosed areas, which can facilitate the spread of germs. While traveling, people often come down with headaches, fever, colds and respiratory illnesses. Travelers are dependent on the sanitation process that the traveler's agent provides. Travelers don't know if or when the vents or the ductwork were cleaned.

Therefore, there is a need in the art for an effective approach to filtering air in interior spaces used by the public. The present invention addresses this unmet need.

FIELD OF THE INVENTION

The present invention relates to a portable device and method for filtering and improving the quality of air in interior spaces.

Devices have been disclosed in the art that relate to filtering air. These include devices that have been patented and published in patent application publications. These devices are often an integral part of an air ventilation system. In view of the devices disclosed in the art, it is submitted that there is a need in the art for an improvement to existing air filtration devices. In view of the present disclosure, it is submitted that the present invention substantially diverges in structural and functional elements from devices and methods in the art, and the instant invention substantially fulfills an unmet need in the art.

SUMMARY OF THE INVENTION

In view of the disadvantages inherent in the known types of air filtration devices in the art, the present invention provides a new and improved portable air filtration device and method, wherein the same can be utilized for providing cleaner air to a user when breathing in an interior space. The present invention provides a portable air filter device that adds an additional filtering system over the vent. Travel filters cannot guarantee one's health when traveling, but they can provide a second line of defense from germs and irritating pollens and provide a reduction on dependence of the primary provider of the air filtering system. The present invention provides a portable air filter device. The portable air filter device includes a semi-permeable air filter disposed within a frame. The present invention provides a removable device for additional filtering of air on an airplane, hotel, motels, cruise ships, travel buses, rental car and other public spaces. Temporary travel filters are easy to install and remove.

The invention provides an adjustable filter with a membrane adapted to fit over an air vent in an airplane, hotel, and other public spaces. The height and width of the filter can be adjusted or created to firmly secure the filter and ensure clean air is being emitted from the vents.

The invention provides frequent travelers with an adjustable air vent filter capable of filter air in a motel, hotel, cruise ship bedroom, airplane, and other spaces.

The invention features various small round and square filters designed to accommodate different sizes of vents.

The invention includes three forms of attachments such as a double-face adhesive, hook and loop fastener adhesive, and a magnetic adhesive.

The invention eliminates worry of a traveler suffering from illnesses due to unfiltered, unsanitary air blowing through a vent.

The invention effectively prevents the spread of germs and bacteria for all inhabitants of the room, airplane cabin, and the like.

It is therefore an object of the present invention to provide a portable air filtration device for filtering air exiting an air ventilation system and entering an interior space by way of a vent.

It is another object of the present invention to provide a method for filtering air in an interior space that utilizes the device.

Another object of the present invention is to provide a convenient method for filtering air exiting a vent, optionally disposed on a surface.

Yet another object of the present invention is to provide a portable method for filtering air exiting a vent, optionally disposed on a surface.

Another object of the present invention is to provide a portable and effective device that may be readily manufactured from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of the invention will be particularly pointed out in the claims, the invention itself and manners in which it may be made and used may be better understood after a review of the following description, taken in connection with the accompanying drawings, wherein like numeral annotations are provided throughout.

DETAILED DESCRIPTION OF THE INVENTION

Figure 1:
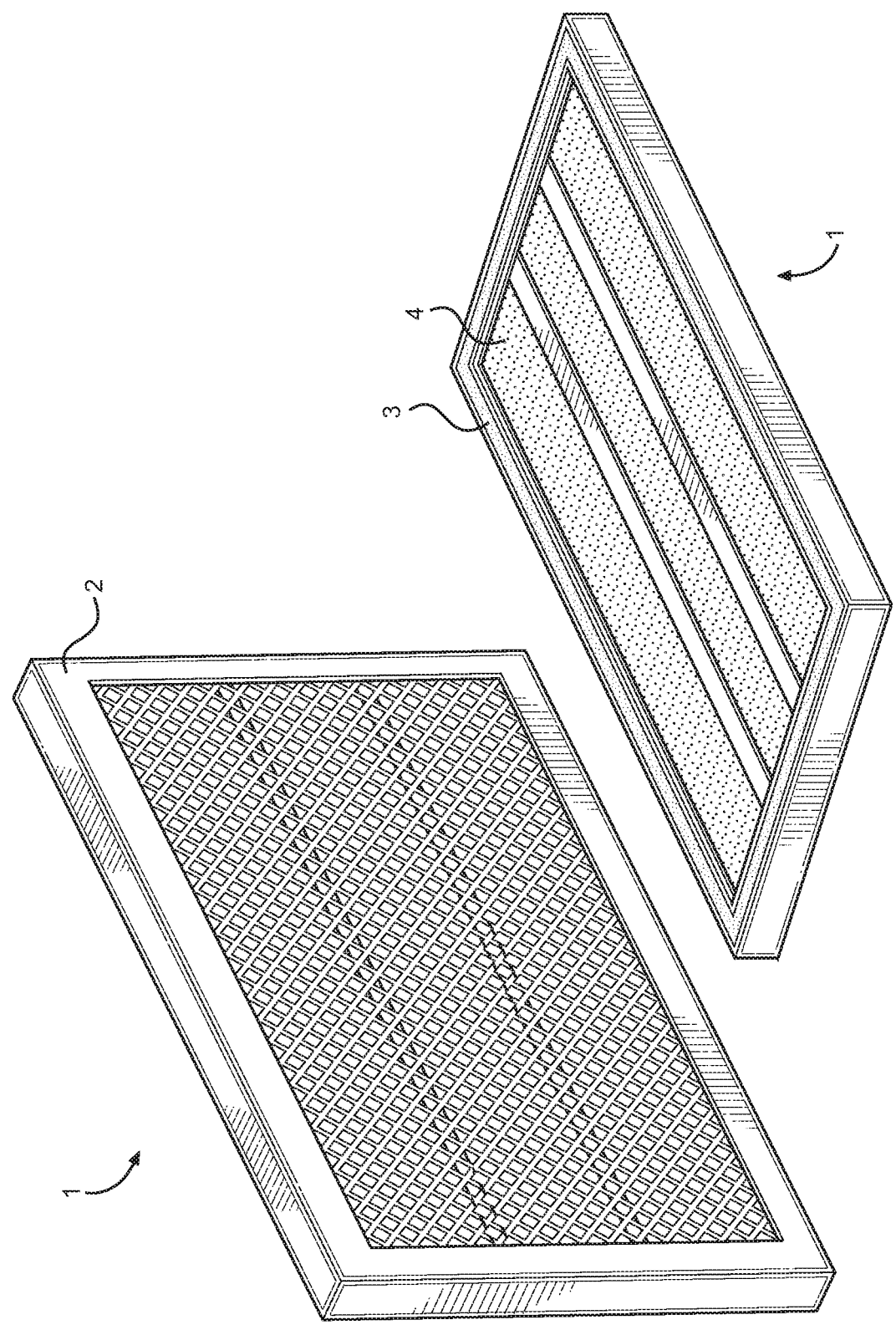
FIG. 1 depicts a perspective view of a rectangular embodiment of the portable air filter standing on a side (left) and laying down (right).

Reference is made herein to the attached drawings. Like reference numerals are used throughout the drawings to depict like or similar elements of the portable air filtration device and method. The figures are intended for representative purposes only and should not be considered limiting in any respect.

The invention provides a modified air filter capable of being installed over any type and size of vent. The device is comprised of a square, round, or rectangular adjustable filter with a membrane adapted to fit over an air vent in an airplane, hotel room, and other public areas. The height and width of the filter can be changed to secure the filter onto any type of vent via three connection methods. A cut to fit version of the filter is also provided.

The filter can be attached via a double-face adhesive, a hook and loop fastener adhesive, and/or a magnetic adhesive. The double-sided adhesive is attached to the existing vent and the filter is then placed over adhesive. Once in place, the new attached filter will provide the traveler with cleaner air through the vent.

The filter can be constructed using materials similar to those in standard air filters. Filter size and shape may vary to accommodate all user needs and preferences. Exact size, measurement, construction, and design specifications may vary upon manufacturing.

In one aspect, the invention provides a method of filtering an air exiting a vent, comprising: contacting the vent or a surface surrounding the vent with an attachment surface of at least one portable air filter; adhering the attachment surface to the vent or the surface such that the at least one portable air filter eclipses the vent; wherein the at least one portable air filter is configured to reduce a concentration of contaminants in the air. It also provides a cut to fit filter to fit various size vents.

In another aspect, the invention provides a method of filtering an air exiting a vent, consisting essentially of: contacting the vent or a surface surrounding the vent with an attachment surface of at least one portable air filter; adhering the attachment surface to the vent or the surface such that the at least one portable air filter eclipses the vent; wherein the at least one portable air filter is configured to reduce a concentration of contaminants in the air.

In another aspect, the invention provides a method of filtering an air exiting a vent, consisting of: contacting the vent or a surface surrounding the vent with an attachment surface of at least one portable air filter; adhering the attachment surface to the vent or the surface such that the at least one portable air filter eclipses the vent; wherein the at least one portable air filter is configured to reduce a concentration of contaminants in the air.

In various embodiments of the invention, the attachment surface is secured to a first side of the at least one portable air filter, the attachment surface is configured to rest flush against the surface, and adhering the attachment surface to the surface comprises applying a force to a second side of the at least one portable air filter; the at least one portable air filter is semi-permeable; the attachment surface is secured to at least two portable air filters; an outline of the vent is shaped substantially similar to at least one selected from the group consisting of: a rectangle, a square, and a circle; the attachment surface is at least one selected from the group including, but not limited to: an adhesive, a hook-and-loop, a magnet, and a combination thereof; the adhesive is double-faced; the method comprises cutting the at least one portable air filter, such that the shape of the at least one portable air filter is about equal to an outline of the vent; the method comprises removing the attachment surface from the surface after filtering the air exiting the vent; and/or before filtering, the air comprises at least one substance selected from the group including, but not limited to: a dirt, a dust, a hair, a debris, a fluid substance, an infectious substance, and a combination thereof.

In various embodiments of the invention, a "cut to fit" filter is cut to attach to one or more vents of varying sizes. If the filter is cut to fit and is not provided in a frame, a frame is constructed by using tape to secure the cut filter to a vent.

Reference is now made to the drawings, which depict one or more exemplary embodiments of the invention.

Referring now to FIG. 1, there is depicted a perspective view of a rectangular embodiment of the portable air filter standing on a side (left) and laying down (right). In the shown embodiment, the portable rectangular air filter 1 comprises a frame 2, an attachment surface 3, and a filter 4. The frame 2 holds and supports the filter 4, and the attachment surface 3 may be used to attach the portable rectangular air filter 1 to a surface that has a vent, or alternatively, may be used to attach the portable rectangular air filter 1 directly to a vent. In the depicted embodiment, the attachment surface 3 is disposed on a rear side of the frame 2, such that the rear side protrudes outward from and forms a lip about the filter. A front side of the filter 4 is flush with a rear side of the frame 2. A rear side of the filter is recessed from the rear side of the frame 2. Thus, when mounted (see FIG. 2), the recess provides space for the existing structure or vent. In various embodiments, the attachment surface 3 is disposed entirely around the filter 4. The attachment surface 3 may be an adhesive, a magnet, a hook and loop, or another type of attachment surface. The magnetic attachment surface may be suitable for attaching the portable rectangular air filter 1 to a metallic surface. The hook and loop attachment surface may include a strip containing a loop surface on one side, and an adhesive on the opposite side, such that the adhesive side interacts with the vent or the surface containing the vent, and the loop surface interacts with a hook surface located on the attachment surface 3 of the frame 2. Distinct from the adhesive that may be present in the hook and loop attachment surface, the attachment surface 3 may be an adhesive, such as a double-faced adhesive, wherein one side of the adhesive attaches to the frame 2 and one side of the adhesive attaches to the vent or surface containing the vent. The portable rectangular air filter 1 may include one or more filters 4. In one embodiment, the portable rectangular air filter 1 includes two or more filters 4. In one embodiment, the filter 4 is cut such that the shape of the at least one portable air filter is about equal to an outline of the vent. In one embodiment, the one or more filters 4 are configured to remove particulates from air passing through a vent. In this way, the air from the vent having particulates of sizes greater than the filter screening size is prevented from passing through the filter. In an alternative embodiment, the portable air filter 1 is provided without a frame 2, and is cut to fit over a vent.

Figure 2:
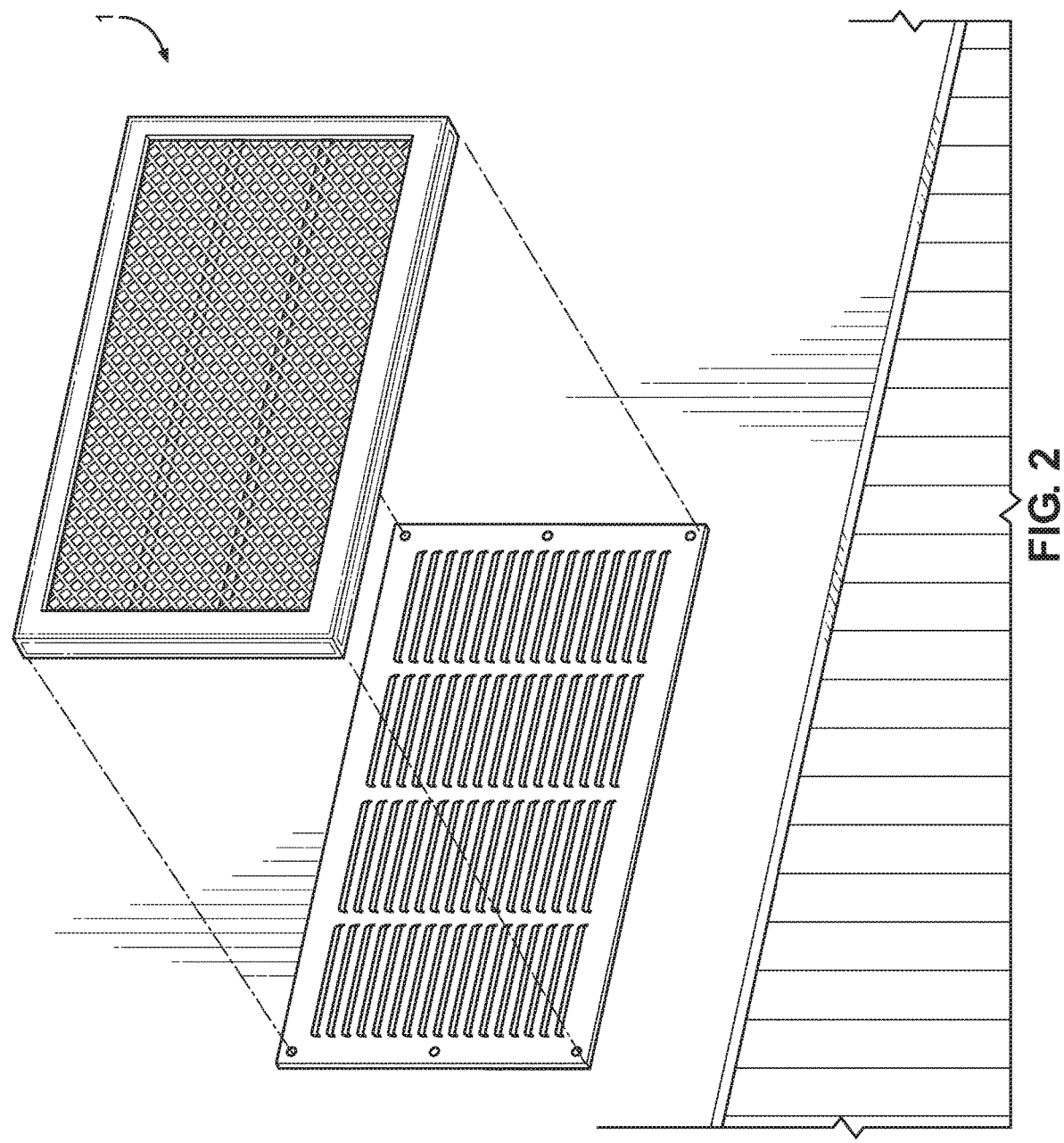
FIG. 2 depicts a perspective view of a rectangular embodiment of the portable air filter being applied to cover an air vent opening.

Referring now to FIG. 2, there is depicted a perspective view of a rectangular embodiment of the portable air filter being applied to cover an air vent opening. The portable rectangular air filter 1 is shaped and sized such that the shape of the portable rectangular air filter 1 is about equal to an outline of a vent. The portable rectangular air filter 1 is contacted to the vent or a surface around the vent, and a force is applied to a surface of the portable rectangular air filter 1 opposite a surface containing the attachment surface, thereby adhering the attachment surface to the vent or the surface around the vent such that the at least one portable rectangular air filter eclipses the vent. Generally, the portable rectangular air filter is configured to rest flush against the vent or the surface around the vent and may be removed, and optionally reused, after use.

Figure 3:
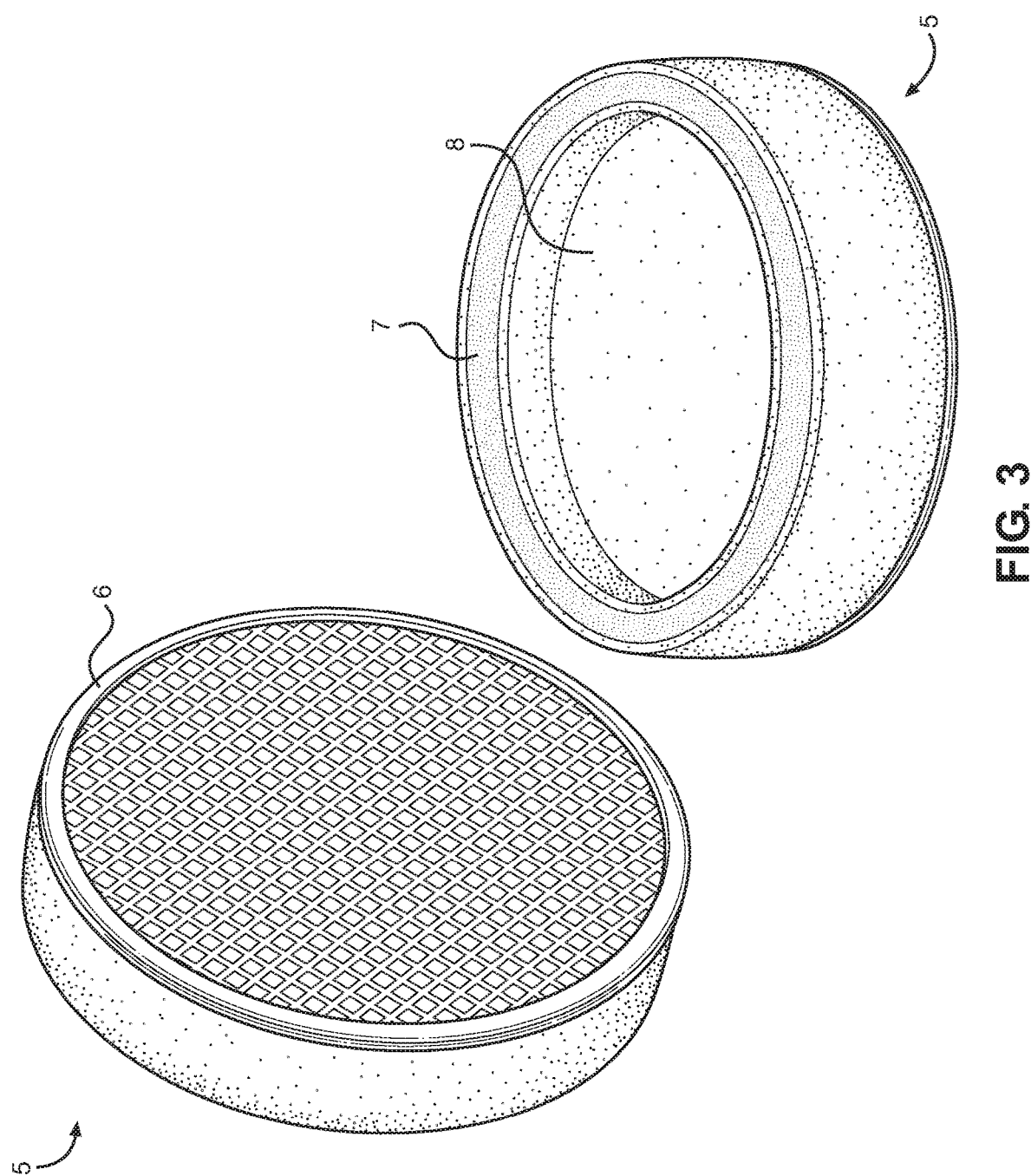
FIG. 3 depicts a perspective view of a circular embodiment of the portable air filter standing on a side (left) and laying down (right).

Referring now to FIG. 3, there is depicted a perspective view of a circular embodiment of the portable air filter standing on a side (left) and laying down (right). In the shown embodiment, a portable circular air filter 5 comprises a frame 6, an attachment surface 7, and a filter 8. The frame 6 holds and supports the filter 8, and the attachment surface 7 may be used to attach the portable circular air filter 5 to a surface that has a vent, or alternatively, may be used to attach the portable circular air filter 5 directly to a vent. In the depicted embodiment, the attachment surface 7 is disposed on a rear side of the frame 6, such that the rear side protrudes outward from and forms a lip about the filter. A front side of the filter 8 is flush with a rear side of the frame 6. A rear side of the filter is recessed from the rear side of the frame 6. Thus, when mounted (see FIG. 4), the recess provides space for the existing structure or vent. In various embodiments, the attachment surface 7 is disposed entirely around the filter 8. The attachment surface 7 may be an adhesive, a magnet, a hook and loop, or another type of attachment surface. The magnetic attachment surface may be suitable for attaching the portable circular air filter 5 to a metallic surface. The hook and loop attachment surface may include a strip containing a loop surface on one side, and an adhesive on the opposite side, such that the adhesive side interacts with the vent or the surface containing the vent, and the loop surface interacts with a hook surface located on the attachment surface 7 of the frame 6. Distinct from the adhesive that may be present in the hook and loop attachment surface, the attachment surface 7 may be an adhesive, such as a double-faced adhesive, wherein one side of the adhesive attaches to the frame 6 and one side of the adhesive attaches to the vent or surface containing the vent. The portable circular air filter 5 may include one or more filters 8. In one embodiment, the portable circular air filter 5 includes two or more filters 8. In one embodiment, the filter 8 is cut such that the shape of the at least one portable circular air filter is about equal to an outline of the vent. In one embodiment, the one or more filters 8 are configured to remove particulates from air passing through a vent. In this way, the air from the vent having particulates of sizes greater than the filter screening size is prevented from passing through the filter. In an alternative embodiment, the portable air filter 1 is provided without a frame 6, and is cut to fit over a vent.

Figure 4:
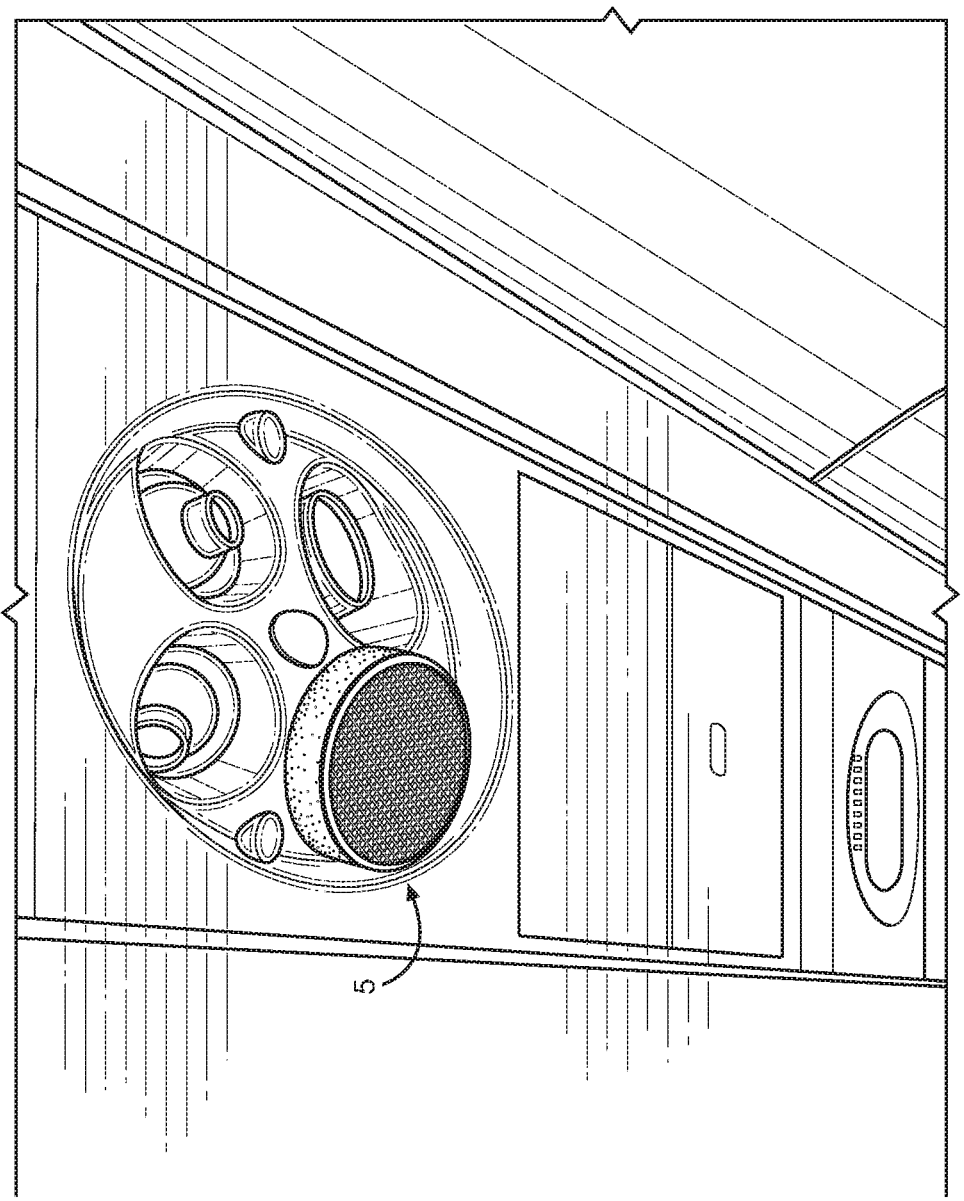
FIG. 4 depicts a perspective view of a circular embodiment of the portable air filter being applied to cover an air vent opening.

Referring now to FIG. 4, there is depicted a perspective view of a circular embodiment of the portable air filter being applied to cover an air vent opening. The portable circular air filter 5 is shaped and sized such that the shape of the portable circular air filter 5 is about equal to an outline of a vent. In the depicted embodiment, the vent comprises four omnidirectional nozzles disposed within a cylindrical recess, whereby each nozzle is selectively adjustable therein. The portable circular air filter 5 is contacted to the vent or a surface around the vent, or to a nozzle, and a force is applied to a surface of the portable circular air filter 5 opposite a surface containing the attachment surface, thereby adhering the attachment surface to the vent or the surface around the vent, or nozzle, such that the at least one portable circular air filter eclipses the vent. Generally, the portable circular air filter is configured to rest flush against the vent or the surface around the vent, or nozzle, and may be removed, and optionally reused, after use.

Figure 5:
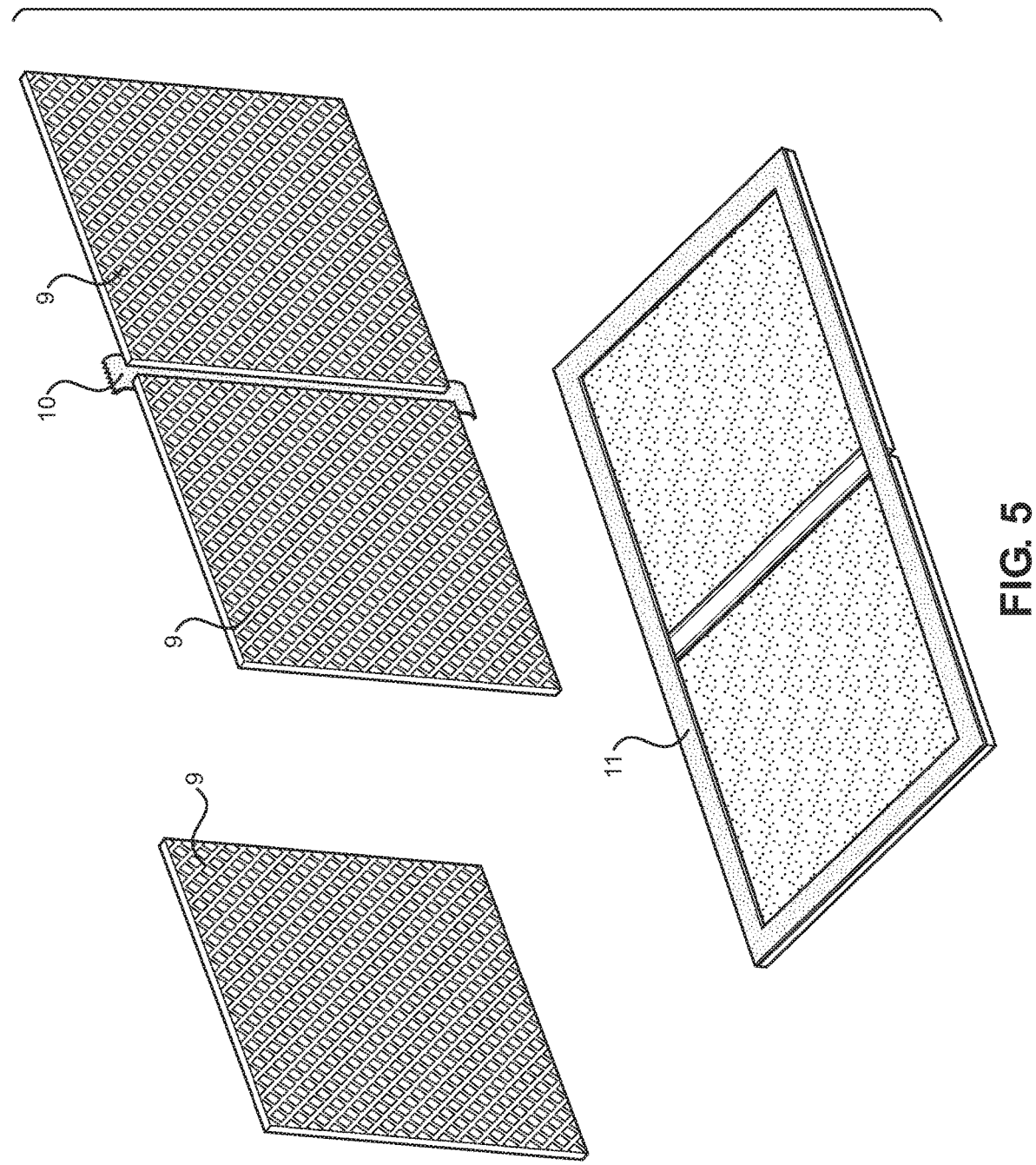
FIG. 5 depicts a perspective view of an embodiment of cut to fit portable air filters.

Referring now to FIG. 5, there is depicted a perspective view of an embodiment of cut to fit portable air filters. A shape of a filter 9 is rectangular. The filter 9 is designed to be able to cut and shape the filter 9 to a size and shape of a vent. A filtering area can be enlarged to fit oversized vents by combining filters 9 and connecting them with thick tape 10. Once the portable air filter is sized to the vent, a thick tape 11 is applied to the edge of the filter. Cut to fit filters can be installed framed or unframed. An attachment of the filter 9 to a vent is the same process as stated above, and as shown in FIG. 2.

The foregoing descriptions of specific embodiments of the present invention have been presented for purposes of illustration and description. They are not intended to be exhaustive or to limit the present invention to the precise forms disclosed, and modifications and variations are possible in view of the above teaching. The exemplary embodiment was chosen and described to best explain the principles of the present invention and its practical application, to thereby enable others skilled in the art to best utilize the present invention and its embodiments with modifications as suited to the use contemplated.

It is therefore submitted that the instant invention has been shown and described in the most practical and exemplary embodiments. It should be recognized that departures may be made which fall within the scope of the invention. With respect to the description provided herein, it is submitted that the optimal features of the invention include variations in size, materials, shape, form, function and manner of operation, assembly, and use. All structures, functions, and relationships equivalent or essentially equivalent to those disclosed are intended to be encompassed by the present invention.

I claim:

1. A method of filtering an air exiting a vent, comprising:
   contacting a vent with an attachment surface of at least one portable air filter, wherein the portable air filter comprises a frame, the attachment surface, and a planar filter, wherein the planar filter is flush with a rear side of the frame;
   adhering the attachment surface to the vent such that the at least one portable air filter eclipses the vent; and
   wherein the at least one portable air filter is configured to reduce a concentration of contaminants in the air.

2. The method of claim 1, wherein the attachment surface is secured to a first side of the at least one portable air filter, wherein the attachment surface is configured to rest flush against the surface, wherein adhering the attachment surface to the surface comprises applying a force to a second side of the at least one portable air filter.

3. The method of claim 2, wherein the attachment surface is secured to at least two portable air filters.

4. The method of claim 2, wherein an outline of the vent is shaped substantially similar to at least one selected from the group consisting of: a rectangle, a square, and a circle.

5. The method of claim 2, wherein the attachment surface is at least one selected from the group consisting of: an adhesive, a hook-and-loop, a magnet, and a combination thereof.

6. The method of claim 5, wherein the adhesive is double-faced.

7. The method of claim 2, comprising cutting the at least one portable air filter, such that the shape of the at least one portable air filter is about equal to an outline of the vent.

8. The method of claim 2, comprising removing the attachment surface from the surface after filtering the air exiting the vent.

9. The method of claim 1, wherein the planar filter rests flush against the vent when the portable air filter is secured to the vent.

10. A method of filtering an air exiting a vent, comprising:
   contacting a surface surrounding a vent with an attachment surface of at least one portable air filter, wherein the portable air filter comprises a frame, the attachment surface, and a planar filter, wherein the planar filter is flush with a rear side of the frame;
   adhering the attachment surface to the surface surrounding the vent such that the at least one portable air filter eclipses the vent; and
   wherein the at least one portable air filter is configured to reduce a concentration of contaminants in the air.

11. The method of claim 10, wherein the attachment surface is secured to a first side of the at least one portable air filter, wherein the attachment surface is configured to rest flush against the surface, wherein adhering the attachment surface to the surface comprises applying a force to a second side of the at least one portable air filter.

12. The method of claim 11, wherein the attachment surface is secured to at least two portable air filters.

13. The method of claim 11, wherein an outline of the vent is shaped substantially similar to at least one selected from the group consisting of: a rectangle, a square, and a circle.

14. The method of claim 11, wherein the attachment surface is at least one selected from the group consisting of: an adhesive, a hook-and-loop, a magnet, and a combination thereof.

15. The method of claim 14, wherein the adhesive is double-faced.

16. The method of claim 11, comprising cutting the at least one portable air filter, such that the shape of the at least one portable air filter is about equal to an outline of the vent.

17. The method of claim 11, comprising removing the attachment surface from the surface after filtering the air exiting the vent.

18. The method of claim 10, wherein the planar filter rests flush against the vent when the portable air filter is secured to the surface surrounding the vent.

19. An air filtration device comprising;
   a frame, at least one planar air filter disposed within a rear interior perimeter of the frame, and an attachment material disposed on an exterior surface of the frame;
   the attachment material configured to removably adhere the frame to a surface surrounding a ventilation outlet;
   the frame sized and shaped to surround and receive an entirety of the ventilation outlet, whereupon the frame being secured to the surface surrounding the ventilation outlet;
   wherein the planar air filter is flush against the ventilation outlet; and
   wherein the planar filter is flush with a rear side of the frame.

* * * * *